United States Patent
Friedrich

(10) Patent No.: US 7,385,950 B2
(45) Date of Patent: Jun. 10, 2008

(54) METHOD OF TRANSMITTING DATA WITH OPTIMIZED TRANSMISSION RATE USING PACKET HEADER THAT DEFINES DATA ENCODING PARAMETERS

(75) Inventor: Ulrich Friedrich, Ellhofen (DE)

(73) Assignee: ATMEL Germany GmbH, Heilbronn (DE)

( * ) Notice: Subject to any disclaimer, the term of this patent is extended or adjusted under 35 U.S.C. 154(b) by 893 days.

(21) Appl. No.: 10/353,298

(22) Filed: Jan. 28, 2003

(65) Prior Publication Data

US 2003/0133435 A1 Jul. 17, 2003

Related U.S. Application Data

(63) Continuation-in-part of application No. PCT/EP02/08515, filed on Jul. 31, 2002.

(30) Foreign Application Priority Data

Aug. 3, 2001 (DE) ................. 101 38 217

(51) Int. Cl.
*H04Q 7/00* (2006.01)
*H04Q 7/24* (2006.01)
(52) U.S. Cl. ..................................... 370/329
(58) Field of Classification Search ............... 370/349, 370/212, 328–330, 345
See application file for complete search history.

(56) References Cited

U.S. PATENT DOCUMENTS

| | | | |
|---|---|---|---|
| 4,720,829 A | | 1/1988 | Fukasawa et al. |
| 5,345,231 A | * | 9/1994 | Koo et al. ............. 340/870.31 |
| 5,724,357 A | * | 3/1998 | Derks ......................... 370/313 |
| 5,818,348 A | | 10/1998 | Walczak et al. |

(Continued)

FOREIGN PATENT DOCUMENTS

DE 19744781 4/1999

(Continued)

OTHER PUBLICATIONS

S. Falahatl et al. ; "Hybrid Type-II ARQ Schemes with Adaptive Modulation Systems for Wireless Channels"; 1999 IEEE Vehicular Technology Conference, Sep. 19-22, 1993; pp. 2691-2695.*

(Continued)

Primary Examiner—Kwang Bin Yao
Assistant Examiner—Tung Q. Tran
(74) Attorney, Agent, or Firm—W. F. Fasse; W. G. Fasse

(57) ABSTRACT

For transmitting data between a base station and a transponder, information packets modulated onto an electromagnetic carrier wave each include a header section, a middle section, and an end section. The data are encoded in the middle section using information symbols, e.g. representing digital "1s" and "0s". The header section of at least the first packet defines the number and unique identifications of all of the symbols that will be used for encoding the data in the middle section of this and/or subsequent packets. This transmission protocol defined in the header section can be varied in subsequent packets to adaptively adjust the transmission rate depending on the existing communication conditions and requirements such as high frequency regulations prescribed by national law. The transmission rate can be considerably increased, in comparison to a transmission rate that would otherwise be necessary for achieving a reliable transmission even under unfavorable conditions.

30 Claims, 2 Drawing Sheets

U.S. PATENT DOCUMENTS

| | | | | |
|---|---|---|---|---|
| 6,044,333 A | * | 3/2000 | Stobbe et al. | 702/106 |
| 6,463,039 B1 | * | 10/2002 | Ricci et al. | 370/277 |
| 6,925,070 B2 | * | 8/2005 | Proctor, Jr. | 370/335 |
| 2002/0044595 A1 | | 4/2002 | Friedrich | |
| 2002/0118666 A1 | * | 8/2002 | Stanwood et al. | 370/345 |

FOREIGN PATENT DOCUMENTS

| | | |
|---|---|---|
| DE | 10050878 | 5/2002 |
| EP | 0473569 | 3/1992 |
| EP | 3687420 | 8/1993 |
| EP | 0680002 | 11/1995 |
| WO | WO01/54339 | 7/2001 |

OTHER PUBLICATIONS

"Working Draft—Radio-frequency Identification Standard for Item Management—Air Interface; Part 1- Passive tags for Operation in the 860 to 930 Mhz Band" ISO/IEC JTC 1/SC 31/WG4/SG 3 (WD18000-6) ; Jan. 2000.

Dieter Conrads; "Daten-kommunikation:Verfahren, Netze Dienste", Moderne Kommunikations- technik, ISBN 3-528-14589-7, publisher Friedr. Vieweg & Sohn Verlag; Braunschweig Germany; 1993, pp. 209, 210, 219-223.

S. Bakhtiyari et al., "Practical Implementation of a Mobile Data Link Protocol With a Type II Hybrid ARQ Scheme and Code Combining", 1993 $43^{rd}$ IEEE Vehicular Technology Conference, May 18-20, 1993, USA, pp. 774-777.

S. Falahati et al.; "Hybrid Type-II ARQ Schemes with Adaptive Modulation Systems for Wireless Channels"; 1999 IEEE Vehicular Technology Conference, Sep. 19-22, 1993; pp. 2691-2695.

ISO/IEC JTC 1/SC 31, ISO-WD 18000-6 M3; Feb. 1, 2002, "Automatic Identification—Radio Frequency Identification for Item Management", "Part 6: Mode 6—Physical Layer, Anti Collision System and Protocols for Ultra High Frequency ($UH_F$) Systems"; pp. 1-125.

Palomar ISO/IEC Wd 18000-6 Description, $1^{st}$ Draft: Oct. 4, 2001; pp. 1-37.

* cited by examiner

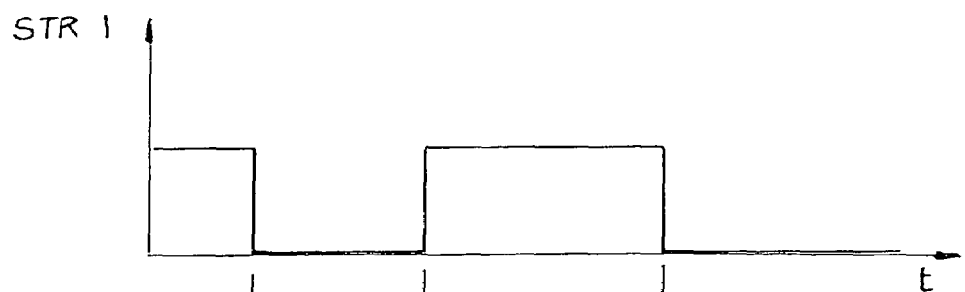
FIG. 3A
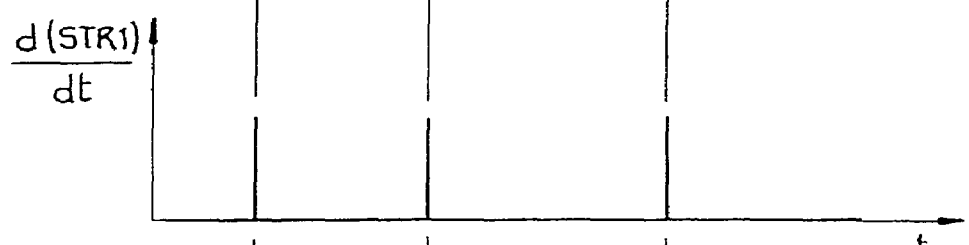
FIG. 3B
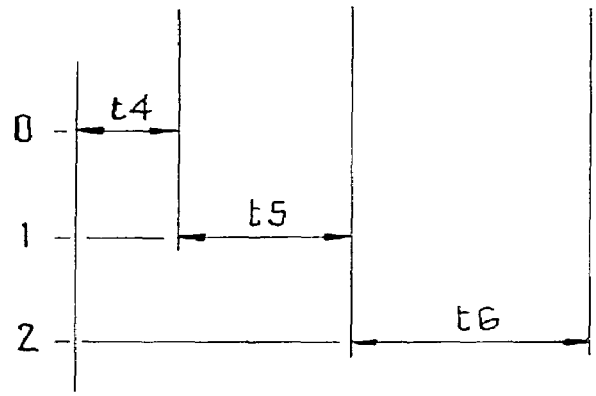

METHOD OF TRANSMITTING DATA WITH OPTIMIZED TRANSMISSION RATE USING PACKET HEADER THAT DEFINES DATA ENCODING PARAMETERS

CROSS-REFERENCE TO RELATED APPLICATION

This application is a Continuation-In-Part under 35 U.S.C. §120 of copending PCT International Application PCT/EP02/08515, which was filed on Jul. 31, 2002 in the German language, which designated the United States of America, and which has not yet been published. The entire disclosure of PCT/EP02/08515 is incorporated herein by reference.

PRIORITY CLAIM

This application is based on and claims the priority under 35 U.S.C. §119 of German Patent Application 101 38 217.0, filed on Aug. 3, 2001, the entire disclosure of which is incorporated herein by reference.

FIELD OF THE INVENTION

The invention relates to a method of transmitting data in a wireless manner between a base station and a transponder, using information packets modulated onto an electromagnetic carrier wave.

BACKGROUND INFORMATION

A method of the above described general type is disclosed in European Patent 0 473 569 B1. In the known method, digital data are exchanged between a base station and a passive transponder by means of an amplitude modulated carrier wave. The individual bits of a data word consist of pulses and gaps in the electromagnetic field, i.e. a time interval in which the electromagnetic field is switched on and a time interval in which the electromagnetic field is switched off (field gap). The field gap serves as a separator between two successive bits. The respective significant value of the bits is determined by the length or duration of the time interval during which the electromagnetic field is switched on for defining the respective particular bit. Furthermore, in the passive system of the known arrangement, the energy needed for operating the transponder is generated or extracted from the carrier field by means of absorption modulation.

A further method pertinent to the present general field is known from the German Patent Laying-Open document DE 100 50 878 A1. The disclosed method uses various different modulation indices for the amplitude modulation of the carrier wave, whereby the data transmission rate is increased, in that several information symbols are transmitted using a single carrier wave. For this purpose, the carrier wave is modulated by means of a prescribed allocation or correlation between the information symbols and the modulation indices. It is a disadvantage that the separation of the information symbols requires a sensitive demodulator circuit, which limits the reach or range of the communication under unfavorable reception conditions.

In general, methods for transmitting data between a base station and a transponder are used in order to carry out an identification or verification in a so-called authentication process. In order that the user of the system does not notice any delay, this process must be carried out and completed within a time span of approximately 100 ms. In view of the ever increasing security requirements, a great number of information packets must be modulated on a carrier wave in ever shorter time spans. The modulation of the information packets may be carried out using amplitude modulation (for example in the manner of amplitude shift keying: ASK) or especially phase modulation (e.g. phase shift keying: PSK) and frequency modulation (e.g. frequency shift keying: FSK) in connection with a pulse width modulation (PWM).

In order to achieve a higher data transmission rate and a greater transmission range, carrier frequencies in the range of ultra high frequencies (UHF) and microwaves are being utilized more often in connection with transponders, whereby the various different national high frequency (HF) transmission regulations influence the data transmission rate through the prescribed frequency bands and/or the width of the side bands.

In any event, a data protocol forms the basis of bi-directional data transmission between a transponder and a base station, whereby this data protocol comprises a header section, a middle section, and an end section. In the header section, among other things, the number of the information symbols and the number of the available significant values of the data bits are specified or defined by a characteristic identifier or identification for the individual symbols. In the middle section of the data protocol, the data are then encoded using the specified identification of the symbols. Such a scheme is, for example, proposed in the International Standards organization (ISO) Working Draft Proposal ISO 18000-6 of February 2001. In order to achieve a reliable data transmission, both any unfavorable communication conditions as well as varying switch-on and switch-off transient characteristics of the transmitting and receiving units of the transponder and of the base station respectively are taken into account. This is achieved by allocating to the symbols, as the characteristic identification thereof, respective modulation intervals having an especially long time duration. Furthermore, in connection with frequencies in the UHF or microwave range, the time duration or length of the modulation intervals is increased, in order to thereby account for the inaccuracy in the determination of the modulation intervals by means of the free-running oscillators or RC charging curves, in other words, for example, in order to avoid read errors in the data transmission.

A disadvantage of the previously known methods is that the relatively long time duration of the modulation intervals necessarily reduces the data transmission rate. The data transmission rate is further reduced in that the modulation stroke or range is adapted to the narrowest permissible side band, in order to thereby satisfy the various national HF regulations or requirements using a single protocol or protocol adjustment. This leads to constantly low data transmission rates. Such low data transmission rates become especially noticeable and problematic as an interfering influence in various time-critical applications.

SUMMARY OF THE INVENTION

In view of the above, it is an object of the invention to provide a method of transmitting data whereby the data transmission rate in a wireless communication can be increased. Another object of the invention is to allow the duration or length of the modulation interval to be adaptively reduced dependent on and responsive to respective prevailing conditions. Yet another object of the invention is to allow the data transmission method to be adjusted and adapted to meet different requirements, such as different national regulations, while achieving an optimal data transmission rate in consideration of the pertinent requirements, and without needing hardware modifications. The invention further aims to overcome or avoid the disadvantages of the prior art, and to achieve additional advantages, as apparent from the present specification.

The above objects have been achieved according to the invention in a method of transmitting data between a base station and a transponder to carry out a contact-less or wireless communication therebetween, while the data transmission rate and/or the spectral distribution of the frequency spectrum of the transmission process may be adjusted by means of a variable identification or characterization of the information symbols used to encode the data. More particularly, the data transmission method involves modulating information packets onto an electromagnetic wave. The information packets each comprise various different information symbols. Each information packet includes at least a header section, a middle section having a data portion or data section, and an end section. According to the invention, the number of information symbols to be used in the transmission is given, and at least one symbol is defined by a variable or changeable identification, in the header section of at least one information packet. Further, the subsequent data are encoded by means of these symbols having the variable identifications and are modulated onto the carrier wave and transmitted in the middle section of the same information packet or a subsequent information packet. Investigations by the inventor have demonstrated that it is especially advantageous to carry out a variation of the identification of the information symbols, to adapt to different transmission conditions or requirements, by changing the time duration of an existing modulation condition used for encoding the data, from one packet to a next packet.

An advantage of the present inventive method is that the important data transmission protocol parameters, such as the number of the information symbols and their respective identification, can be adjusted and set in the header section of an information packet in the data transmission. These protocol parameters, and particularly the identification of the information symbols, can thereby be adjusted and adapted to various different requirements, especially such as various different national regulations. Thereby the data transmission rate can be optimized or at least increased through this adaptation of the identification of the information symbols. For example, the modulation spectrum of the transmitting unit can be adapted to the respective permissible HF bandwidth by means of a shorter time duration of the modulation condition. In this regard, the modulation of the carrier wave can be carried out using PSK, ASK, or FSK methods.

As an example, transponders according to the present invention, i.e. carrying out the method of the invention, can be used in a worldwide application to establish communication links with a high data transmission rate, in compliance with the respective locally applicable national HF regulations, whereby it is possible to achieve short communication times due to the high data transmission rate. This is especially advantageous in connection with a worldwide networking of production processes, and especially also in connection with the worldwide introduction of products that include or are based on transponders carrying out the inventive method. A change of the transponder labels or characteristic operating parameters, or a manual switching or adaptation, to meet the locally applicable national HF regulations, are no longer necessary. Moreover, through a rapid automatic detection, monitoring and control of the distribution channels of goods, it is possible to achieve an economical control of the respective flow of goods.

Furthermore, the present inventive method can be carried out in a data transmission that requires a varying number of information symbols. An example of this is the change in the number of significant values of a data bit when switching from a binary representation to a hexadecimal representation. Another example is the case in which the transmitter occasionally transmits a symbol for the synchronisation of the data clock or the system clock. This type of synchronisation is especially advantageous for use in the gigahertz (GHz) range, because in this range, a system or data clock pulse is generally not derived from the carrier frequency, for energy reasons.

Moreover, the data transmission rate can be optimized or at least increased by suitably adapting the identification and/or the number of the information symbols to the prescribed or prevailing communication conditions. For example, when the transmission is to be carried out over a long communication distance and/or with a poor signal-to-noise ratio, it is thereby advantageous to reduce the number of the symbols and to simplify the identification thereof. A further advantage of the inventive method is that it can be carried out with any one of a frequency modulation, a phase modulation, and an amplitude modulation.

In a further detailed embodiment of the invention, the number of the symbols and their identification is defined by the transmitter at the beginning of a data transmission. In this context, the identification of the symbols in the header section is selected, so that the highest possible data transmission rate can be achieved for the given or existing communication conditions. Especially for stationary arrangements of a transponder and a base station, the evaluation effort for evaluating the information packets, and particularly the data portion or section thereof, is reduced, because the header section only needs to be evaluated once at the very beginning of the data transmission.

According to another detailed embodiment of the inventive method, following the original identification of the information symbols provided in the header section of a first information packet of a transmission, only those symbols of which the respective identification has been changed will be transmitted in the header section of a subsequent information packet. In this manner, the overall data transmission rate is only slightly degraded by the need to transmit the header section, because only those symbols that have changed are included in the header section. The evaluation of the information packet in the receiver (which may be the transponder or the base station) is accelerated in the case of a small or missing header section, because for such packets essentially only the data portion thereof needs to be evaluated. Moreover, especially in connection with a change of the significant value of data bits that comprise plural significant values, the number of the symbols may be quickly adapted to the changed requirements of the protocol, without having to specify all of the symbols in the header section.

In one embodiment of the inventive method, the symbols and their identification given in the header section of a respective information packet determine the encoding of the data in the data portion or section of this same information packet. The evaluation is thereby simplified because the header section is not examined or analyzed to determine to what extent the number of the symbols and their identification has changed in comparison to the parameters of a header section of a preceding information packet. Namely, the protocol parameters for each information packet are internally completely specified within the header section of this information packet in a self-contained manner, so that no comparison with the header sections of other information packets needs to be carried out. In this manner, an immediate adaptation of the evaluation of the data portion of the individual information packet is achieved. Furthermore, when each packet's data section is prefaced with a header section containing a complete definition of all of the symbols utilized in the data section, the evaluation of the data section can be carried out in the receiver without reference to or accessing of a stored data protocol, for example a protocol that has been stored in a nonvolatile memory area. Thereby, such a stored data protocol becomes unnecessary, and thus the complexity and the current consumption of the integrated circuit are reduced, which in turn means an increased communication range of a passive transponder.

A further detail of the inventive method provides that a different value is allocated to at least the identification of a symbol in the header section of an information packet, as compared to the value that is used for encoding the data with this identification in the data section. Thereby, for example, the header section may give boundary or limit values for the identifications, while in the data section, the data are modulated onto the carrier wave with typical values of the identification, which increases the reliability of the transmission. For example, in connection with an ASK, PSK or FSK modulated carrier wave, the maximum length or the minimum length of the respective modulation interval is given in the header section, while thereby typical values are calculated in the receiver for the evaluation of the data section.

In a different further embodiment, the number of the symbols and/or their identification in the header section is varied by the transmitter (which may be the base station or the transponder) so long until at least one answer or response signal with a prescribed encoding is received. Through this variation of the protocol parameters in the header section, it is possible to carry out a data transmission between the base station and the transponder, when the evaluation of the data section is carried out with a prescribed protocol in the transponder or in the base station. A further advantage is that only the key data for the data transmission, such as the type of the modulation process, for example, need to be defined in the transponders or in the base station. In order to accelerate the process of matching the protocol between the base station and the transponder, it is advantageous in this context, if the receiver notifies the sender of the parameters or embodiment of the protocol that is optimal for the receiver, by means of a prescribed encoding that is preferably already included in the first answer or response signal. Hereby, the communication matching process can be accelerated, and a high data transmission rate can be adjusted and set with only a few information packets.

Further, in another embodiment of the invention, the transmitter begins a matching process with a small or large number of symbols, which has a great length or duration of the modulation intervals, and then varies the number of the symbols until the receiver sends back an answer or response signal with a prescribed encoding. Furthermore, it is advantageous in connection with a prescribed number of symbols, to successively reduce the length or duration of one or more modulation intervals beginning from a prescribed starting value, dependent on the particular modulation technique being used. In this context, the transmitter then ends the successive reduction of the duration of the modulation intervals when the receiver sends back a response signal with a prescribed encoding. For this, the receiver may, for example, reduce the transmitting power of the response signal to below a prescribed value. This indicates, for example, that the minimum reliable modulation interval, and thus the maximum transmission rate, have been reached.

Another advantageous feature of a further embodiment is achieved in a situation with varying or changing communication conditions, whereby the invention provides for repeating the adjustment of the data transmission rate, for example, in that the receiver sends back an encoded response signal to initiate a readjustment of the data transmission rate, or the adjustment is automatically repeated after a prescribed time has elapsed in the event of a longer duration transmission. The starting point for the new or repeated adjustment of the data transmission rate is provided by the previously determined values of the protocol. In order to take the existing communication conditions into account, the receiver transmits back to the transmitter, not only the information regarding the number of the symbols to be transmitted and their identification, but also further information, for example, such as a field strength information regarding the field strength of the signal being received by the receiver. The transmitter then evaluates this additional information of the response signal and thereby takes into account the existing communication conditions, when setting the protocol parameters in the header section of the next successive information packet.

In yet another particular embodiment of the inventive method, it is advantageous if only the base station specifies the data protocol and the transponder simply receives and takes over this data protocol. Thereby the complexity of the integrated circuit in the transponder, and the current consumption thereof, are reduced. This is especially important for passive transponders, in order to reduce the energy consumption thereof. To achieve a rapid adaptation of the protocol parameters, the transponder sends back to the base station information regarding its protocol requirements and/or a field strength information regarding its received signals, preferably already in the first response signal. After receiving this response signal, the base station accordingly adjusts or adapts the protocol parameters to be transmitted in the next successive information packet.

Experiments conducted by the applicants have shown that it is advantageous for the passive transponder to provide the value of its supply voltage as the field strength information in the response signal to the base station. Further, it is advantageous if the transponder repeatedly informs the base station of the value of the supply voltage of the transponder, insofar as or whenever this supply voltage falls above or below a prescribed threshold value. After receiving this supply voltage information, the base station correspondingly changes the identification of the information symbols in the subsequent information packet or packets so that the passive transponder will appropriately increase or reduce its energy absorption from the transmitted field. In this context, for example, the identification of the symbols may relate to the length or duration of the modulation intervals in the case of a pulse width modulated (PWM) encoded carrier wave. In this manner, by means of the adaptive matching or adaptation of the protocol parameters, the data transmission rate and the transmission range of the communication with passive transponders may be optimized.

BRIEF DESCRIPTION OF THE DRAWINGS

In order that the invention may be clearly understood, it will now be described in connection with example embodiments, with reference to the accompanying drawings, wherein:

FIG. 3A is a schematic representation of a header section received by the transponder for a three-valued bit significance; and FIG. 3B is a schematic representation of the time derivative of the signal of FIG. 3A.

DETAILED DESCRIPTION OF PREFERRED EXAMPLE EMBODIMENTS AND OF THE BEST MODE OF THE INVENTION

Figure 1A:
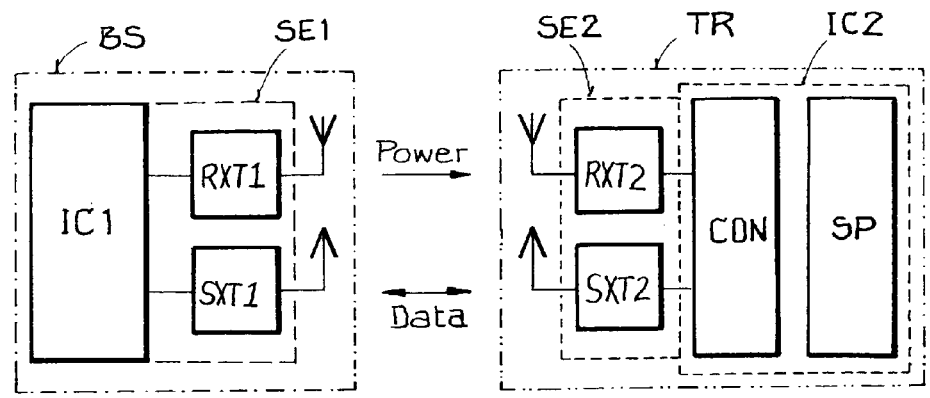
FIG. 1A is a schematic block circuit diagram of a system including a base station and a passive transponder for carrying out the inventive method.

FIG. 1A shows an arrangement for transmitting data according to the inventive method between a base station BS and a passive transponder TR. The data transmission may be a two-way communication, namely either the base station BS or the transponder TR may operate as the transmitter or the receiver at any given time. The passive transponder TR extracts the energy needed to operate its circuitry from the carrier wave transmitted by the base station BS. Such systems, among other applications, are used in motor vehicle systems, for example with the transponder TR installed in a door key and the base station BS installed in the automobile itself, whereby the data transmission relates to information for locking or unlocking, or opening or closing the door, or operating other accessaries of the automobile.

The base station BS comprises an integrated circuit IC1, which controls a transmit and receive unit SE1 including a receiver part RXT1 and a transmitter part SXT1. The transponder TR comprises an integrated circuit IC2 which includes a control unit CON and a storage or memory unit SP, in which are stored the initial characteristic values or parameter identification values of an initial protocol to be used for the data transmission of information packets. The transponder TR further comprises a transmit and receive unit SE2, including a receiver part RXT2 and a transmitter part SXT2, which are each connected to the control unit CON. To carry out a data transmission, the base station BS transmits a modulated carrier wave via the transmitter part SXT1, and this modulated wave is received by the receiver part RXT2 of the transmit and receive unit SE2 of the transponder TR. The received signal is then passed on to the control unit CON for evaluation. The transmit and receive unit SE2 also absorbs the energy necessary for operating the transponder TR from the modulated carrier wave.

Figure 1B:
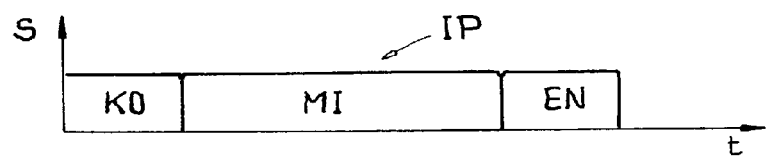
FIG. 1B is a schematic representation of a data word or information packet used in the inventive method.

A representative transmission protocol is schematically shown in FIG. 1B. The illustrated information packet IP comprises a header section or header KO, a middle section MI including a data portion or data section, and an end section EN. The information packet IP is transmitted from the respective active transmitter with the header section KO being transmitted first, i.e. before the middle section MI and then the end section EN. The header section KO defines the number and the identification of the symbols that will be used for encoding the data in the middle section MI. Furthermore, the header section KO can be used for synchronization of the data protocol. Then, in the data section of the middle section MI, the particular data that are to be transmitted are encoded using the symbols that were identified in the header section KO. The end section EN contains a prescribed signal or identification which informs the receiver that the end of the information packet has been reached. The information provided in the header section KO, once it is received and evaluated in the receiver, allows the receiver to immediately recognize what constitutes a valid and meaningful symbol in the following encoded data in the middle section MI of the information packet or packets, and allows the receiver to be informed of any change in the transmission protocol "on the fly", i.e. during the transmission procedure.

In the further details described herein, the inventive method will be explained in connection with a PWM encoded carrier signal, whereby the modulation index of the carrier wave alternates between 0% (no signal) and 100% (full power signal) for simplicity. In such an embodiment, the data information or the significant value of the data bits is encoded via the duration or length of the individual modulation intervals (e.g. a prescribed shorter modulation interval representing a digital "0" and a prescribed longer modulation interval representing a digital "1"). It should be understood, in general, that other modulation or encoding techniques could be utilized alternatively. In the described example, the length or duration of the modulation intervals is derived in the transponder TR from the measured (i.e. counted) number of field pulses at frequencies of 125 kHz, or is determined by means of the number of clock cycles or pulses of a free-running oscillator or of the charging voltage of an RC combination in the transponder TR for frequencies in the range of GHz.

When the transponder TR recognizes that it is receiving a data transmission, at the beginning of the data transmission the protocol parameters are extracted out of the header section KO of the first received information packet IP by the control unit CON. These extracted received protocol parameters may then, for example, be compared with the prescribed protocol values that are stored in the memory unit SP. Another possibility would be to subject the received protocol parameters to a plausibility test, for example determined on the basis of a prescribed relative time difference. In such a case, it is not necessary to store a prescribed initial protocol value set, so the storage or memory unit SP can be omitted.

Furthermore, at the beginning of a data transmission, the transponder TR sends back to the base station BS the value of the supply voltage of the transponder TR. Based on the values or information provided by the transponder TR in the response signal, the base station BS then corrects or adjusts the transmission protocol specified in the header section KO of the next subsequent information packet IP to be adapted to the particular values provided in the response signal from the transponder TR. Particularly, the length or duration of the modulation intervals for encoding the data in the data section of the middle section MI of the next subsequent information packet IP will be calculated from the value of the supply voltage of the transponder TR. Thereafter, the transponder TR acknowledges receipt of the new protocol values in a subsequent response signal.

The inventive method achieves a significant advantage in that the base station BS adjusts and sets the data transmission rate based on the protocol values provided by the transponder TR and dependent on the supply voltage of the transponder TR. In this manner, the data transmission rate can be appropriately adjusted and set for various different communication conditions, so that a high data transmission rate can be achieved adaptively under varying communication conditions. Under unfavorable communication conditions, the modulation intervals are extended or increased (which reduces the data transmission rate), only to the extent necessary to thereby achieve the required increase in the reliability of the data transmission and the communication range. Since the data transmission protocol parameters can be adjusted or adapted "on the fly" during the data transmission, the data transmission rate can always be adjusted and adapted to the highest possible rate under the respective existing communication conditions. It is not necessary for the data transmission rate to be permanently fixed or set (e.g. in hardware) to a value that assumes or accounts for the possible worst-case communication condition.

Figure 2A:
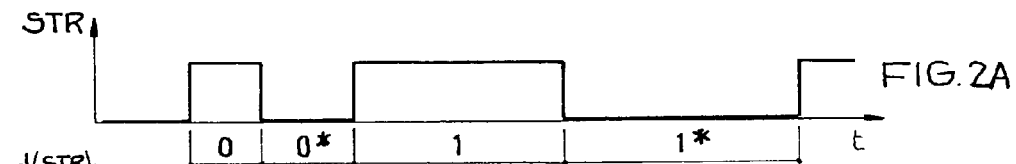
FIG. 2A is a more detailed schematic representation of the header section of an information packet received by the transponder, including three types of information symbols, namely a null or zero "0", a one "1", and a field gap "*"
Figure 2B:
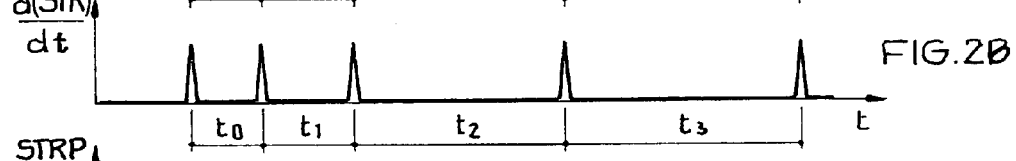
FIG. 2B is a schematic representation of the time derivative of the signal of FIG. 2A, as formed in the transponder.
Figure 2C:
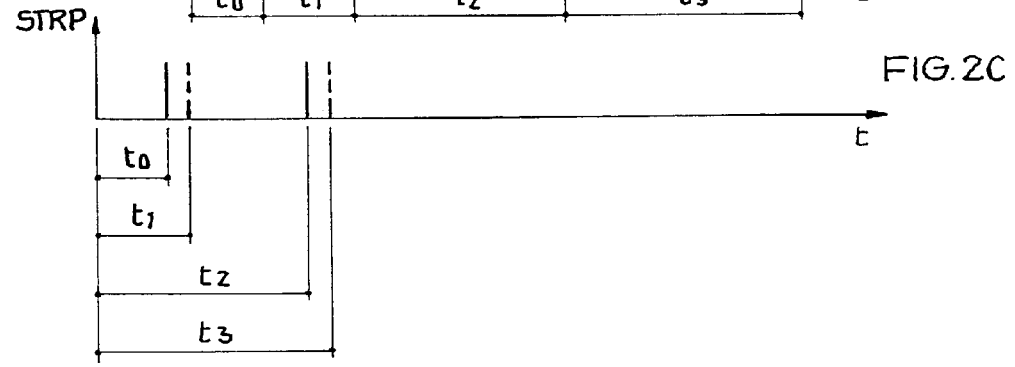
FIG. 2C is a schematic representation of the length or duration of the respective modulation intervals of the signal of FIG. 2B, as calculated in the transponder.

FIGS. 2A, 2B and 2C schematically illustrate further details of a portion taken from the header section KO of an information packet IP of a PWM encoded carrier wave for a signal reception in the transponder TR. In this context, in the header section KO of the information packet IP, the base station BS defines a respective identification of each significant value of a data bit that has a two-fold or binary value, by means of the time duration or length of the modulation interval. In other words, the duration of the modulation interval defines the binary value of the respective data bit.

FIG. 2A schematically represents a portion of the header section KO of the signal STR received by the transponder TR. To define the valid values of the data bits that will be used for encoding the actual data in the following middle section MI of the packet, the header section KO of the signal STR includes a short modulation interval allocated to the value "0" and a long modulation interval allocated to the value "1", with a short field gap "0*" separating the 0 bit and the 1 bit. A further longer field gap "1*" follows the bit allocated to "1". The field gaps "0*" and "1*" are periods when the carrier wave is switched off, i.e. when the base station BS is not transmitting any signal. On the other hand, the pulse width or duration of the signal, during the intervals when a signal is transmitted by the base station BS, defines the bit's binary value "0" or "1". The transponder TR evaluates this header information so that it can recognize the valid possible symbols or bits in the encoded data in the middle section MI, for example based on actual received pulse durations in the middle section MI compared to expected valid pulse durations (e.g. limit values) as specified in the header KO.

FIG. 2B schematically represents the (absolute value of the) time derivative d(STR)/dt of the received signal STR as calculated or determined in the transponder TR. Each signal transition from signal-on to signal-off of the signal STR results in a pulse or spike in the time derivative shown in FIG. 2B. The time duration of each modulation interval can thus easily be respectively determined as the time between successive spikes or pulses in the time derivative of FIG. 2B. The time duration t0 is allocated to the modulation interval of the "0" bit, the time duration t1 is allocated to the interval of the next successive field gap "0*", the time duration t2 is allocated to the modulation interval of the "1" bit, and the time duration t3 is allocated to the interval of the next successive field gap "1*".

The time durations t0, t1, t2, and t3 determined in FIG. 2B are then compared with one another by being schematically plotted respectively against time on the scale STRP in FIG. 2C. Thereby, a respective short or small time difference is recognized between the time durations t0 and t1, and between the time durations t2 and t3. These are the time differences between the duration of the zero bit pulse "0" and the field gap "0*" and between the one bit pulse "1" and the field gap "1*". Ideally, those time durations would respectively be the same, but actually, the small time difference apparent in FIG. 2C arises due to the switch-on and switch-off transient behavior of the input circuit of the transmit and receive unit SE2. Particularly, the magnitude of this small time difference is proportional to the difference in the switch-off transient behavior and the switch-on transient behavior of the input circuit of the transmit and receive unit SE2. The significantly larger time difference between t0 and t2 allows the binary bit "0" and the binary bit "1" to be reliably recognized and distinguished from one another. The duration of t2 may, for example, be some fixed multiple (e.g. two or three times) of the duration of t0.

Once the transponder has recognized the valid durations (or maximum or minimum limit durations) of the bits "0" and "1" defined in the header section KO, then it is ready to evaluate data encoded in the data section of the middle section MI of the information packet IP being received.

An advantage of the inventive method is that the header section KO can identify and transmit not only the typical time duration, but also (or alternatively) the lower and upper limit values of the duration of the modulation intervals. This improves the reliability and accuracy of the data decoding by the receiver. Moreover, for example, with two identifications in the header section, the two valid symbols for a two-valued or binary data bit and the symbol of the end section (limit values) can be defined.

According to the invention, through the adaptive adjustment of the transmission protocol to the existing communication conditions, a high (highest possible) data transmission rate can be achieved under the respective prevailing conditions, while complying with the respective applicable different national HF regulations, without requiring any hardware change in the base station or the transponder.

FIGS. 3A and 3B represent a segment or portion of the header section of an information packet for a pulse width modulated (PWM) encoded carrier wave, with respect to the reception of the signal in the transponder TR. In this regard, the base station BS will define each respective possible value of the characteristic identification of respective data bits having three significant values, respectively by means of the time duration of the modulation intervals of the three possible bit values. FIG. 3A illustrates the signal STR1 received by the transponder TR, whereby this signal STR1 can be determined or derived from the detection of the variations in the electromagnetic field that is transmitted from the base station BS. FIG. 3B illustrates the time derivative d(STR1)/dt of the received signal STR1. The time duration t4 is allocated to a short modulation interval that is associated with the bit value "0". The time duration t5 is allocated to a somewhat longer modulation interval, which is associated with the bit value "1". Still further, the time duration t6 is allocated to a longest modulation interval, which is associated with the bit value "2". Thereby, the three possible significant values of information symbols have been identified, and these identifications (the respective associated modulation time durations) are then used for encoding and decoding the data in the manner discussed above.

If the transmission conditions change, or if the transmission is to be carried out under other HF regulations or the like, the respective identifications (time durations) for the three possible symbols (bit values) may simply be changed by specifying changed time durations in the header section of the next information packet. In that context, the shortest possible time durations for still achieving a reliable transmission under the given conditions may be specified, whereby the data transmission rate can be maximized. Also, the number of possible distinct symbols may be changed (e.g. switching from three distinct bit values to two or four (or more) distinct bit values), depending on the given conditions.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of transmitting date between a base station and a passive transponder, one of which may operate as a transmitter and another of which may operate as a receiver at a given time, said method comprising the following steps:
    transmitting an electromagnetic carrier wave from said transmitter to said receiver;
    in said transmitter, encoding and modulating a succession of information packets onto said electromagnetic carrier wave, wherein said information rackets include at least a selected information packet and one or more subsequent information packets after said selected information packet, wherein each one of said information packets comprises a header section, a middle section, and an end section, wherein said middle section of at least one of said information rackets includes said data that is encoded by a set of information symbols including at least one variable information symbol and that is modulated onto said carrier wave, wherein said header section of said selected information packet includes identifications which identify respective time durations that are respectively allocated to and that respectively define said information symbols, wherein said time durations include at least one variable time duration that defines said at least one variable information symbol;
    in said receiver, receiving said electromagnetic carrier wave with said information packets modulated thereon;
    evaluating said header section of said selected information packet in said receiver to determine therefrom said identifications which identify said time durations that respectively define said information symbols;
    decoding said data in said receiver based on said identifications of said information symbols;
    extracting, from said carrier wave, electrical energy needed to operate said passive transponder; and
    changing a time value of said variable time duration from a first time value in said selected information packet to a second time value different from said first time value in at least one of said one or more subsequent information packets.

2. The method according to claim 1, wherein said header section of said selected information packet further indicates the number of said information symbols included in said set.

3. The method according to claim 1, wherein said information symbols include a first symbol representing a binary one value and a second symbol representing a binary zero value.

4. The method according to claim 3, wherein said first symbol comprises a first signal pulse modulated onto said electromagnetic carrier wave, said second symbol comprises a second signal pulse modulated onto said electromagnetic carrier wave, and said respective time durations of said first and second symbols respectively comprise a first pulse duration that characteristically defines said first signal pulse and a second pulse duration that characteristically defines said second signal pulse.

5. The method according to claim 4, wherein said modulating is carried out as a pulse width modulation.

6. The method according to claim 5, wherein said first and second pulse durations included in said header section are respective nominal values of a pulse duration of said first signal pulse representing said binary one value and of said second signal pulse representing said binary zero value, respectively.

7. The method according to claim 5, wherein said first and second pulse durations included in said header section are respective maximum or minimum limit values of a pulse duration of said first signal pulse representing said binary one value and of said second signal pulse representing said binary zero value, respectively.

8. The method according to claim 1, wherein said time durations in said header section of said selected information packet comprise a minimum limit value or a maximum limit value of a duration of a modulation interval of said modulating that is characteristic of a respective given one of said information symbols.

9. The method according to claim 8, wherein said data are encoded with said information symbols in said middle section by modulating said electromagnetic carrier wave with respective modulation intervals having respective nominal durations greater than said minimum limit value and less than said maximum limit value that are characteristic for each given one of said information symbols respectively.

10. The method according to claim 1, wherein said time durations include a given time duration, a first value is allocated to said given time duration of a given one of said information symbols in said header section, and a second value different from said first value is allocated to said given time duration of said given information symbol used for encoding said data with said given information symbol in said middle section.

11. The method according to claim 1, wherein said transmitter specifies and fixes a transmission protocol to be used in said transmitting of said data at a beginning of said transmitting by specifying said identifications of said information symbols in said header section, which define said transmission protocol.

12. The method according to claim 11, wherein said transmission protocol remains in effect, and said information symbols of said header section of said selected information packet are used for encoding said data in said middle section of said selected information packet and in said middle sections of said subsequent information packets.

13. The method according to claim 12, wherein said header sections of said subsequent information packets do not include an identification of said information symbols.

14. The method according to claim 12, wherein said header section of a further successive one of said information packets following after said subsequent information packets includes only an identification of only any one or more of said information symbols that has changed or differs from said information symbols of said set of information symbols of which said identifications were included in said header section of said selected information packet.

15. The method according to claim 1, wherein said header sections of said subsequent information packets respectively include only an identification of only any one or more of said information symbols that has changed or differs from said information symbols of said set of information symbols of which said identifications were included in said header section of said selected information packet.

16. The method according to claim 1, wherein said header section of each given one of said information packets includes respective identifications of information symbols that are to be used for encoding said data in said middle section of that said given one of said information packets, and wherein said middle section of that said given one of said information packets includes said data encoded by said information symbols of which said respective identifications are included in said header section of that said given one of said information packets.

17. The method according to claim 1, wherein said identifications of said information symbols in said header section determine a data transmission rate of said transmitting of said data, and further comprising changing said data transmission rate by said changing of said time value of said variable time duration in at least one of said one or more subsequent information packets relative to said selected information packet without carrying out any hardware modifications in said base station or said transponder.

18. The method according to claim 17, further comprising carrying out said changing of said data transmission rate responsive to transmission conditions so as to achieve a fastest value of said data transmission rate while still reliably performing said receiving, evaluating and decoding steps.

19. The method according to claim 1, further comprising, after said step of receiving said electromagnetic carrier wave, a step of transmitting a response signal from said receiver back to said transmitter.

20. The method according to claim 19, wherein said response signal includes a field strength information that is indicative of a field strength of said electromagnetic carrier wave being received by said receiver.

21. The method according to claim 20, wherein said receiver is said passive transponder, and wherein said field strength information is derived from a present value of a supply voltage of said passive transponder.

22. The method according to claim 19, wherein said receiver is said passive transponder, and wherein said response signal includes a supply voltage information that is indicative of a present value of a supply voltage of said passive transponder.

23. The method according to claim 22, wherein said transmitter is said base station, and further comprising, in said base station,
evaluating said supply voltage information so as to compare said present value of said supply voltage of said passive transponder to a prescribed maximum threshold value or a prescribed minimum threshold value, and
if said present value of said supply voltage fails above said maximum threshold value or below said minimum threshold value, then carrying out said changing of said time value of said variable time duration in said header section of said at least one of said one or more subsequent information packets.

24. The method according to claim 22, wherein said identifications of said information symbols in said header section determine a data transmission rate of said transmitting of said data, and further comprising changing said data transmission rate by said changing of said time value of said variable time duration in at least one of said one or more subsequent information packets relative to said selected information packet in response to and dependent on said supply voltage information included in said response signal.

25. The method according to claim 19, wherein said response signal includes receiver information indicative of at least one of an optimum transmission protocol of said receiver or a reception characteristic of said receiving of said electromagnetic carrier wave by said receiver, and further comprising, in said transmitter, successively changing at least one of a number of said information symbols or said identifications of said information symbols in said header sections of successive ones of said information packets responsive to and dependent on said receiver information in said response signal until said receiver information corresponds to a prescribed encoding.

26. The method according to claim 25, wherein said step of successively changing comprises successively increasing or decreasing said number of said information symbols in said header sections of said successive ones of said information packets beginning from a prescribed starting value of said number of said information symbols.

27. The method according to claim 25, wherein said time durations comprise respective unique durations of respective modulation intervals characterizing said information symbols, and said step of successively changing comprises successively increasing or decreasing said unique durations of said modulation intervals in said header sections of said successive ones of said information packets beginning from respective prescribed starting values of said unique durations of said information symbols.

28. The method according to claim 25, wherein said step of successively changing is re-initiated and carried out repeatedly.

29. The method according to claim 1, wherein said transmitter is said base station, said receiver is said passive transponder, said identifications of said information symbols define a transmission protocol, and said transmission protocol is specified by said base station and is adopted and followed by said passive transponder.

30. A method of transmitting data between a base station and a passive transponder by means of an electromagnetic wave, with information packets including various symbols modulated onto the electromagnetic wave, wherein each one of the information packets respectively comprises a header section, a middle section with a data section, and an end section, characterized in that
the passive transponder extracts, from the electromagnetic wave, electrical energy needed to operate the passive transponder;
a number of the symbols and identifications of the symbols are given in the header section of at least one selected information packet of the information packets, and at least one of the symbols is defined by a variable identification;
the identifications respectively comprise time durations that are respectively allocated to the symbols and that respectively define the symbols;
the data are encoded in accordance with the identifications including the variable identification and are transmitted in the middle section of the at least one selected information packet or a subsequent information packet following the at least one selected information packet; and
the variable identification comprises a variable time duration, and a time value of the variable time duration is changed from a first time value in the selected information packet to a second time value different from the first time value in the subsequent information packet.

* * * * *

UNITED STATES PATENT AND TRADEMARK OFFICE
CERTIFICATE OF CORRECTION

PATENT NO. : 7,385,950 B2  Page 1 of 1
APPLICATION NO. : 10/353298
DATED : June 10, 2008
INVENTOR(S) : Ulrich Friedrich It is certified that error appears in the above-identified patent and that said Letters Patent is hereby corrected as shown below:

Title page,
Item [*], Notice,
Line 3, after "by", replace "893" by --832--;
Item [56], References Cited, OTHER PUBLICATIONS,
Line 1, after "S.", replace "Falahatl" by --Falahati--;
Line 2, after "for", delete --□□--;
Line 3, after "1993;", delete --□□--;
Page 2, column 2, line 2, after "Moderne", replace "Kommunikations- technik" by --Kommunikationstechnik--;

Column 5,
Line 11, after "in a", replace "nonvolatile" by --non-volatile--;

Column 10,
Line 20, after "evaluate", insert --the--;

Column 11,
Line 17, after "transmitting", replace "date" by --data--;
Lines 25 and 31, after "information", replace "rackets" by --packets--;

Column 13,
Line 53, after "voltage", replace "fails" by --falls--.

Signed and Sealed this

Twenty-sixth Day of May, 2009

JOHN DOLL
*Acting Director of the United States Patent and Trademark Office*